United States Patent
Kargl

(10) Patent No.: US 11,466,595 B2
(45) Date of Patent: Oct. 11, 2022

(54) SLIDING ELEMENT WITH PARTIALLY HARDENED LATCHING ELEVATION

(71) Applicants: THYSSENKRUPP PRESTA TECCENTER AG, Eschen (DE); thyssenkrupp AG, Essen (DE)

(72) Inventor: Rene Kargl, Feldkirch (AT)

(73) Assignees: THYSSENKRUPP PRESTA TECCENTER AG, Eschen (LI); THYSSENKRUPP AG, Essen (DE)

( * ) Notice: Subject to any disclaimer, the term of this patent is extended or adjusted under 35 U.S.C. 154(b) by 19 days.

(21) Appl. No.: 16/639,172

(22) PCT Filed: Aug. 9, 2018

(86) PCT No.: PCT/EP2018/071605
§ 371 (c)(1),
(2) Date: Feb. 14, 2020

(87) PCT Pub. No.: WO2019/034516
PCT Pub. Date: Feb. 21, 2019

(65) Prior Publication Data
US 2020/0232349 A1   Jul. 23, 2020

(30) Foreign Application Priority Data

Aug. 16, 2017 (DE) ..................... 10 2017 214 297.9

(51) Int. Cl.
*F01L 1/047* (2006.01)
*F01L 13/00* (2006.01)
*F01L 1/08* (2006.01)

(52) U.S. Cl.
CPC .......... *F01L 1/047* (2013.01); *F01L 13/0036* (2013.01); *B23P 2700/02* (2013.01); *F01L 1/08* (2013.01);
(Continued)

(58) Field of Classification Search
CPC ......... F01L 1/047; F01L 1/08; F01L 1/34406; F01L 1/34409; F01L 1/053;
(Continued)

(56) References Cited

U.S. PATENT DOCUMENTS

| | | | |
|---|---|---|---|
| 6,601,554 B1 * | 8/2003 | Schafer ................. | F01L 1/3442 123/90.17 |
| 2013/0000442 A1 * | 1/2013 | Wiesner .............. | F01L 13/0036 74/567 |

(Continued)

FOREIGN PATENT DOCUMENTS

| | | |
|---|---|---|
| DE | 199 36 632 A | 2/2001 |
| DE | 10 2004 011 586 A | 10/2004 |

(Continued)

OTHER PUBLICATIONS

English translation of the International Search Report issued in PCT/EP2018/071605, dated Nov. 16, 2018.

*Primary Examiner* — Devon C Kramer
*Assistant Examiner* — Kelsey L Stanek
(74) *Attorney, Agent, or Firm* — thyssenkrupp North America, LLC

(57) ABSTRACT

A slide element for displacement of a cam segment in an axial direction along a camshaft may include a slide sleeve, which has a longitudinal toothing formed at least sectionally along an inner wall of the slide sleeve and has a latching section formed on the inner wall and serving for interaction with a latching means. The latching section comprises a latching means receiving part, which comprises at least two latching grooves formed adjacently in an axial direction and at least one latching elevation formed between the latching grooves of the latching means receiving part and directed inward. The latching elevation may be partially hardened exclusively in a latching means transfer region.

9 Claims, 3 Drawing Sheets

(52) U.S. Cl.
CPC ............... *F01L 2001/0473* (2013.01); *F01L 2013/0052* (2013.01); *F01L 2303/01* (2020.05)

(58) Field of Classification Search
CPC ............ F01L 13/0036; F01L 13/0042; F01L 2013/0052; F01L 2001/0473; B23P 2700/02
USPC ..................................................... 123/90.18
See application file for complete search history.

(56) References Cited

U.S. PATENT DOCUMENTS

| | | | | |
|---|---|---|---|---|
| 2014/0174389 | A1* | 6/2014 | Zeidler | ............... F01L 13/0042 123/90.31 |
| 2016/0084368 | A1* | 3/2016 | Meusel | ............... F01L 13/0036 74/567 |
| 2017/0081984 | A1* | 3/2017 | Kunz | ................. F01L 13/0015 |
| 2017/0321577 | A1* | 11/2017 | Junge | ................. F01L 13/0036 |
| 2019/0112950 | A1* | 4/2019 | Nitz | ........................ F01L 1/08 |

FOREIGN PATENT DOCUMENTS

| | | |
|---|---|---|
| DE | 103 49 901 A | 6/2005 |
| DE | 10 2005 027 142 A | 12/2006 |
| DE | 10 2009 059 712 A | 9/2011 |
| DE | 10 2011 109 256 A | 2/2013 |
| DE | 10 2014 007 189 A | 11/2015 |
| DE | 10 2015 008 623 A | 3/2016 |
| DE | 10 2015 010 751 A | 3/2016 |
| DE | 10 2015 011 243 A | 3/2017 |

\* cited by examiner

SLIDING ELEMENT WITH PARTIALLY HARDENED LATCHING ELEVATION

CROSS REFERENCE TO RELATED APPLICATIONS

This application is a U.S. National Stage Entry of International Patent Application Serial Number PCT/EP2018/071605, filed Aug. 9, 2018, which claims priority to German Patent Application No. DE 10 2017 214 297.9, filed Aug. 16, 2017, the entire contents of both of which are incorporated herein by reference.

FIELD

The present disclosure generally relates to camshafts, including slide elements for the displacement of cam segments.

BACKGROUND

A valve drive of an internal combustion engine is described in DE 10 2004 011 586 A1. The valve drive comprises a camshaft on which at least one cam carrier is arranged in a rotationally conjoint and axially displaceable manner. The cam carrier is moved by means of means for axial displacement with respect to the camshaft between a first axial position and a second axial position. Means for imparting an axial clamping force (latching means) are formed between the camshaft and the cam carrier. Possibilities for the production of the latching means and possible hardening are not described in DE 10 2004 011 586 A1.

DE 103 49 901 A1, for example, provides information for production of a toothing, in particular a longitudinal toothing on the outer circumferential surface of a shaft. The outer toothing is in this case applied on the base camshaft directly by rolling and then hardened. Here, the hardening can be realized for example by titanium nitration.

It is also fundamentally known that laser hardening can be used in particular for hardening of toothings on shafts such as camshafts. However, in the known methods, warping, in particular necking in the toothing, which necking hinders trouble-free axial displacement of the slide element along the shaft with teeth, in particular toothed shaft, disadvantageously occurs. In order to make possible displacement of the slide element in an axial direction on the toothed shaft, it is fundamentally known to implement an additional broaching process, such as for example hard broaching.

Thus a need exists to at least partially eliminate the above-mentioned disadvantages in the production, in particular in the hardening, of a toothing of a shaft, in particular a toothed shaft. A need exists to provide a slide element and a camshaft which, in a simple and inexpensive manner, make possible at least minimal wear of the toothing of the shaft and/or of the slide piece, meanwhile avoiding additional machining processes.

DETAILED DESCRIPTION

Figure 1:
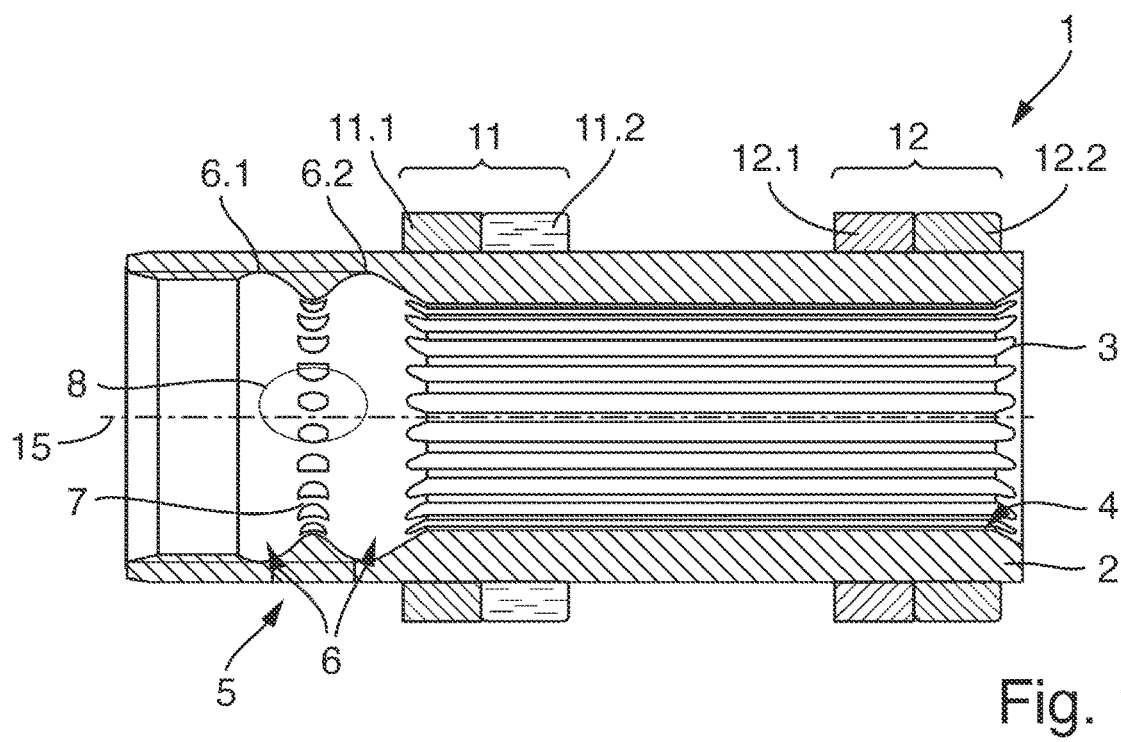
FIG. 1 is a side sectional view of an example slide element.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to a slide element for the displacement of at least one cam segment. The present disclosure also generally relates to a camshaft comprising a corresponding slide element. The present disclosure further relates to methods for producing a slide element.

As those having ordinary skill in the art will understand, various features and details that are described in conjunction with the slide element self-evidently also apply in conjunction with the camshaft and vice versa in each case, such that reference can be made reciprocally with respect to the disclosure of the individual aspects of the present disclosure.

The slide element for the displacement of a cam segment in an axial direction along a camshaft comprises at least one slide sleeve, which has a longitudinal toothing formed at least sectionally along an inner wall of the slide sleeve and has a latching section formed on the inner wall and serving for interaction with a latching means. The latching section comprises a latching means receiving part, which comprises at least two latching grooves formed adjacently in an axial direction. The latching section furthermore comprises at least one latching elevation formed between the latching grooves of the latching means receiving part and directed inward. According to the invention, the latching elevation is partially hardened exclusively in a latching means transfer region. According to the invention, the latching elevation is consequently hardened not completely, but merely partially. It is conceivable for the longitudinal toothing, in particular the inner longitudinal toothing, to extend through the entire passage opening of the slide sleeve of the slide element. It is also conceivable, however, for the longitudinal toothing to be formed merely sectionally on the inner wall of the slide element, in particular of the slide sleeve. The latching section advantageously adjoins the longitudinal toothing or interrupts the latter. It is also conceivable that, between a region of the longitudinal toothing on the inner wall of the slide sleeve and the latching section, an untreated, in particular unmachined, inner wall region of the slide sleeve is formed, with the result that the longitudinal toothing, in particular the region of the longitudinal toothing, and the latching section, at least in an axial direction as viewed along a longitudinal axis of the slide sleeve, are formed spaced apart from one another.

The latching means interacting with the latching section advantageously serves for limiting a movement of the slide element taking place in an axial direction, and for advantageously locking the slide element in an axial position.

According to the invention, the latching section comprises a latching means receiving part, which has at least two latching grooves formed adjacently in an axial direction, wherein it is also conceivable for the latching means receiving part to comprise three or more latching grooves formed adjacently in an axial direction. The latching grooves are advantageously of V-shaped or U-shaped, in particular semicircular, form and accordingly extend as depressions from the inner wall radially outward into the material of the slide sleeve. A latching elevation rises between the correspondingly formed latching grooves. With a formation of at least two latching grooves, a single latching elevation between said latching grooves is consequently formed. With the formation of for example three latching grooves, two latching elevations, in particular a (first) latching elevation between the first and the second latching groove and a further (second) latching elevation between the second and the third latching groove are consequently formed. The latching grooves themselves advantageously extend in a circumferential direction at least over a part of the circumference, advantageously over the full circumference, on the inner wall of the slide sleeve. Correspondingly, it is conceivable for the at least one latching elevation (or the plurality of latching elevations) also to extend at least over part of the circumference, advantageously over the full circumference, on the inner wall in a circumferential direction. The latching elevation is advantageously formed in the shape of a projection. The latching elevation advantageously serves for delimiting the latching means at least in an axial direction. The latching transfer region is advantageously the region in which the latching means is transferred from one latching groove into the other latching groove. This means that, in said latching means transfer region, the latching means slides over the latching elevation so as to pass from a first latching groove into a second latching groove (and vice versa). Accordingly, it is necessary that, in particular in the region of the latching means transfer, the latching elevation has a corresponding hardness for the purpose of avoiding, or at least advantageously minimizing, material wear with the displacement of the slide element in an axial direction along a shaft.

It is furthermore conceivable that the latching elevation is heated exclusively partially inductively, in particular partially hardened, in the latching means transfer region. It is furthermore conceivable within the scope of the invention that the latching elevation is heated at least in the latching means transfer region by means of an inductor for the partially inductive hardening. In this case, the width of the inductor corresponds to the length of the latching means transfer region formed in a circumferential direction and to be hardened. The inductor itself is advantageously a constituent part of an induction device, and serves to inductively heat the latching means transfer region of the latching elevation in order for this to be particularly advantageously subsequently quenched through the application, for example, of a flowable cooling medium to the heated latching means transfer region.

By means of the partial hardening of the latching elevation, in particular by means of the partial induction hardening of the latching elevation, the latching elevation can advantageously be hardened without warping, and a subsequent machining process, such as for example a hard broaching process, can be omitted. This advantageously allows an improvement in the cycle times for the production of a slide element and consequently for a significant reduction in the production costs thereof, in particular for a shaft, fitted with the slide element at a later stage, for the production of a camshaft. Moreover, a drop in hardness in the required region, in particular in the latching means transfer region, which is to be expected, is advantageously prevented. The use of an inductor with small dimensions, in particular an inductor which is correspondingly adapted to the latching means transfer region to be heated, in particular to the length of the latching means transfer region, furthermore also leads to a reduction in the production costs. Advantageously, it is also the case that, via the inductor dimensioned in a manner correspondingly adapted to the latching means transfer region, a flowable cooling medium is conducted to the heated location of the latching elevation, in particular to the latching means transfer region to be hardened, in order, after attainment of the required heat, to make possible cooling of the latching means transfer region with subsequent tempering, so as to achieve a required hardness.

It is likewise conceivable that the latching means transfer region of the latching elevation comprises at least one tooth, advantageously two teeth, particularly advantageously three or more teeth, which are formed adjacently to one another in a circumferential direction. The width of the inductor advantageously corresponds to the length of the teeth, arranged adjacently in a circumferential direction and to be hardened, of the row of teeth of the slide element or of the latching elevation.

It is likewise possible that the latching elevation comprises a toothed ring of ring-like form, which comprises a plurality of teeth formed adjacently in a circumferential direction. Here, it is conceivable that the at least one tooth, advantageously the plurality of teeth, of the latching means transfer region or of the latching elevation is formed in an extension to the longitudinal toothing of the slide sleeve. The tooth or the teeth of the latching means transfer region of the latching elevation is/are advantageously a constituent part of the longitudinal toothing and is/are merely interrupted by the latching grooves or by the formation of the latching grooves. In this way, simple production of the latching elevation is made possible. Accordingly, the tooth base diameter of the tooth or the plurality of teeth in the latching means transfer region advantageously corresponds to the tooth base diameter of the longitudinal toothing. Accordingly, it is consequently also the case that the tooth tip diameter of the longitudinal toothing is identical to the tooth tip diameter of the at least one tooth or the plurality of teeth of the latching means transfer region of the latching elevation.

It is furthermore possible that the slide element additionally comprises the at least one cam segment, which comprises at least two axially adjacently arranged cams, which have mutually different cam profiles comprising a cam base circle and comprising a cam elevation. It is furthermore possible that the slide element comprises two or more cam segments having mutually axially adjacently arranged cams, wherein the number of cams may also comprise three or more cams. Advantageously, in this case, the slide element serves for the (joint) displacement of a plurality of cam segments in an axial direction along a shaft of the camshaft.

Within the scope of the invention, it is furthermore conceivable that the latching elevation is partially hardened in a latching means transfer region which is opposite the cam elevation of the at least one cam segment. Accordingly, with the formation of a toothed ring as a latching elevation, only those teeth of the toothed ring of the latching elevation which are opposite the cam elevation of the cam segment connected to the slide sleeve are hardened. This is due to the fact that internal tests have shown that, with such an arrangement of the latching means, a radial force against the slide element in the region of the cam base circle of the cam segment connected to the slide sleeve allows sufficient latching of the slide element. Advantageously, in this way, merely the region which also interacts directly with the latching means and is consequently subjected to increased wear is hardened. It is possible to leave out the machining of other (adjacent or remaining) regions of the latching elevation and thereby to minimize the costs for the processing of the slide sleeve and to avoid warping for example in the toothed ring of the latching elevation.

It is likewise conceivable that the latching means transfer region, for the partial hardening of the latching elevation, is cooled by means of a flowable cooling medium which is able to be conducted via an inductor to the latching means transfer region. It is advantageously possible, directly after attainment of the required heat in the latching means transfer region, for the latter to be cooled by means of a corresponding flowable cooling medium for attainment of the required hardness without the slide element itself, in particular the slide sleeve, having to be transferred to a further machining installation for a further machining step. This advantageously allows a reduction in the production costs for the slide element owing to the reduced machining times.

Also claimed is a camshaft of an internal combustion engine, comprising a shaft and at least one slide element according to the preceding type which is movable on the shaft in a manner rotationally conjoint with respect to the shaft and in an axial direction along the shaft. The camshaft furthermore comprises a latching means, comprising an inelastic latching means head and an elastic latching means neck. The latching means neck is connected to the shaft such that the latching means neck is arranged in a recess extending radially into the shaft, while the latching means head interacts with the latching section of the slide element. According to the invention, the latching means head is spherical and the latching means neck is a resiliently elastic element, in particular a compression spring element.

All of the advantages that have already been described with regard to a slide element according to the first aspect of the invention arise in the case of described camshaft according to the invention.

A further object of the invention is to propose an advantageous method for producing a slide element or a camshaft, in particular a slide element according to the invention or a camshaft according to the invention.

According to the invention, said object is achieved by a method as claimed in claim 11, 12 and/or 13.

Here, features and details that are described in conjunction with the method self-evidently also apply in conjunction with the device according to the invention and vice versa, such that reference is always or can always be made reciprocally with respect to the disclosure of the individual aspects of the invention.

It is self-evident that the features mentioned above and the features yet to be discussed below are able to be used not only in the respectively specified combination but also in other combinations or individually without departing from the scope of the present invention.

Figure 2:
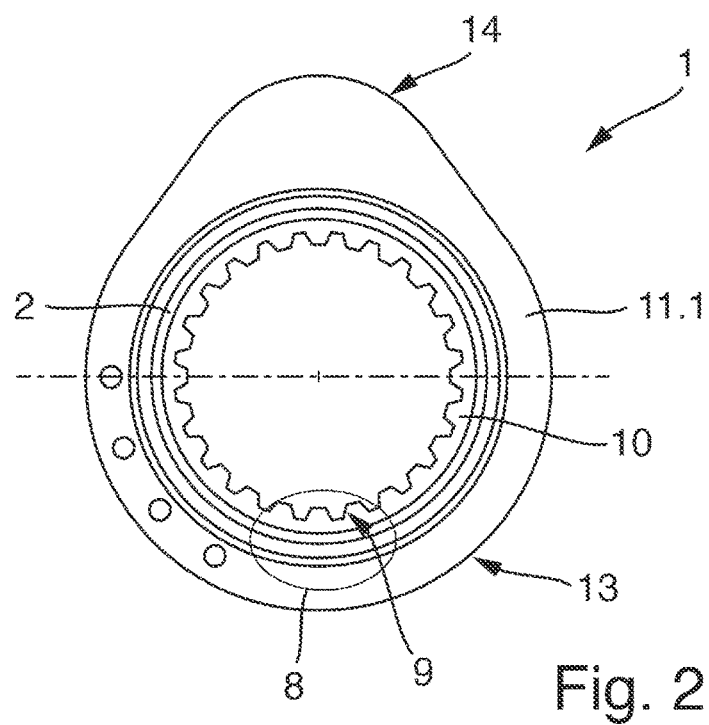
FIG. 2 is a plan view of the example slide element shown in FIG. 1.

FIGS. 1 and 2 show an embodiment of a slide element 1 according to the invention. The slide element 1 comprises a slide sleeve 2 which, on its inner wall 4, comprises at least sectionally a longitudinal toothing 3 which extends in the direction of the longitudinal axis 15 of the slide sleeve 2 at least along a section of the inner wall 4. As viewed in an axial direction, adjacent to the longitudinal toothing 3, the slide sleeve 2 of the slide element 1 comprises a latching section 5. The latching section 5 comprises a latching means receiving part 6 and a latching elevation 7. The latching means receiving part 6 comprises a first latching groove 6.1 and a second latching groove 6.2, which are formed spaced apart from one another by the latching elevation 7. The latching grooves 6.1 and 6.2 comprise a half shell-shaped configuration and extend from the inner wall 4 of the slide sleeve 2 radially outward at least sectionally into the material of the slide sleeve 2. Advantageously, the latching section 5 directly adjoins a distal end of the longitudinal toothing 3 as viewed in an axial direction. However, it is also conceivable that, between the longitudinal toothing 3 and the latching section 5 as viewed in an axial direction, an unmachined or untreated section of the inner wall 4 is present. The latching section 5, in particular the latching elevation 7 of the latching section 5, comprises a latching means transfer region 8. As shown in particular in FIG. 2, the latching means transfer region 8 is situated in a region of the latching elevation 7 which is formed opposite a cam elevation 14 of a cam. Advantageously, the slide element 1 also comprises at least one cam segment, advantageously two or more cam segments, 11 and/or 12. FIG. 1, for example, shows two cam segments 11 and 12, wherein the first cam segment 11 comprises a first cam 11.1 and a second cam 11.2, and the second cam segment 12 comprises a first cam 12.1 and a second cam 12.2. Both cams 11.1, 11.2 or 12.1, 12.2 of a respective cam segment 11 or 12 advantageously comprise a mutually different cam profile. Accordingly, the cams 11.1, 11.2 or 12.1, 12.2 of each cam segment 11, 12 advantageously comprise a jointly formed cam base circle 13 and an in each case differently geometrically formed cam elevation 14. The cam segments 11,12 are advantageously connected in a force-fitting manner to the slide sleeve 2, in particular are pressed onto the slide sleeves 2. However, it is also conceivable that the cam segments 11, 12 are connected in a form-fitting or materially bonded manner to the slide sleeve 2.

As furthermore shown in FIGS. 1 and 2, the embodiment of the slide element 1 according to the invention shown here comprises a toothed ring 10 which forms the latching elevation 7. The toothed ring 10 comprises a plurality of teeth 9, which are formed uniformly distributed in a manner spaced apart from one another in a circumferential direction. The teeth 9 formed in the toothed ring 10 can be advantageously viewed in an extension to the longitudinal toothing 3 of the slide sleeves 2. This means that the longitudinal toothing 3 is interrupted by the formation of the latching grooves 6.1, 6.2 such that the latching elevation 7, in particular the toothed ring 10, is a constituent part of the longitudinal toothing 3. Accordingly, the number of teeth 9 of the toothed ring 10 corresponds to the number of teeth of the longitudinal toothing 4 formed on the inner wall 4 of the slide sleeve 2 in a circumferential direction. The number of teeth 9 in the latching means transfer region 8 can vary according to requirement. In this regard, it is conceivable that, as a latching means transfer region 8, merely one tooth, two teeth of else three or more teeth are used. It is considered to be advantageous if the latching means transfer region 8 is formed opposite the cam elevation 14 of the cam segments 11, 12, since, in this region, contact between the latching means (not shown here) and the latching elevation 7, in particular sliding of the latching means from one latching groove 6.1 or 6.2 over into another latching groove 6.1 or 6.2, is realized. Accordingly, it is necessary to harden in particular the latching means transfer region 8 of the latching elevation 7 such that wear of the latching elevation 7 in the latching means transfer region 8 owing to the continuous contact, or the continuous sliding of the latching means from one latching groove 6.1 or 6.2 over into another latching groove 6.1 or 6.2, is avoided or advantageously minimized.

Figure 3:
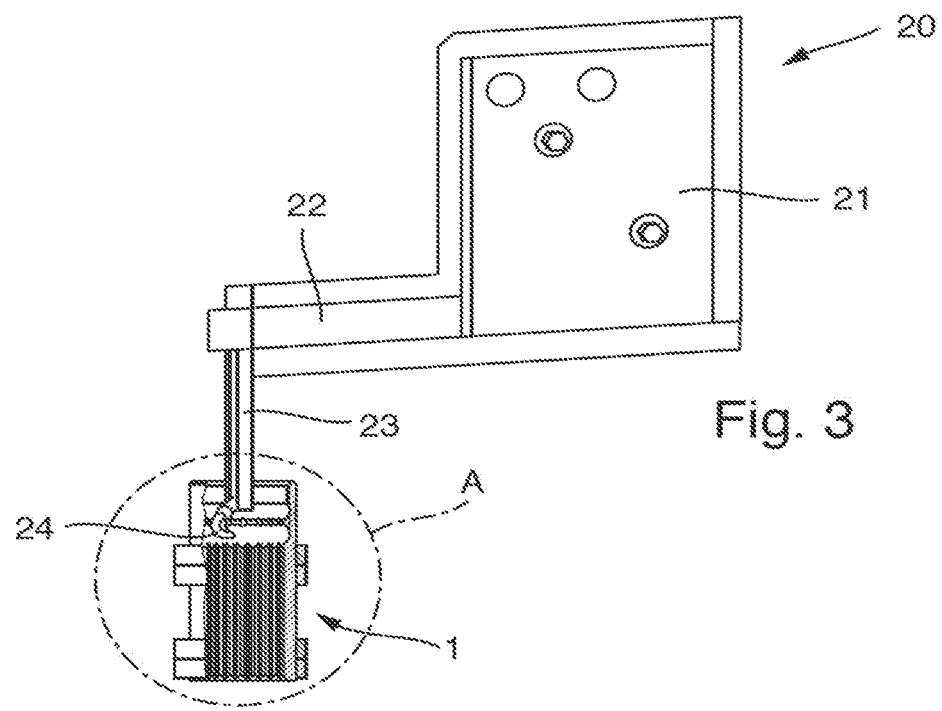
FIG. 3 is a side sectional view of an example induction device in a machining process for the example slide element illustrated in FIGS. 1 and 2.
Figure 4:
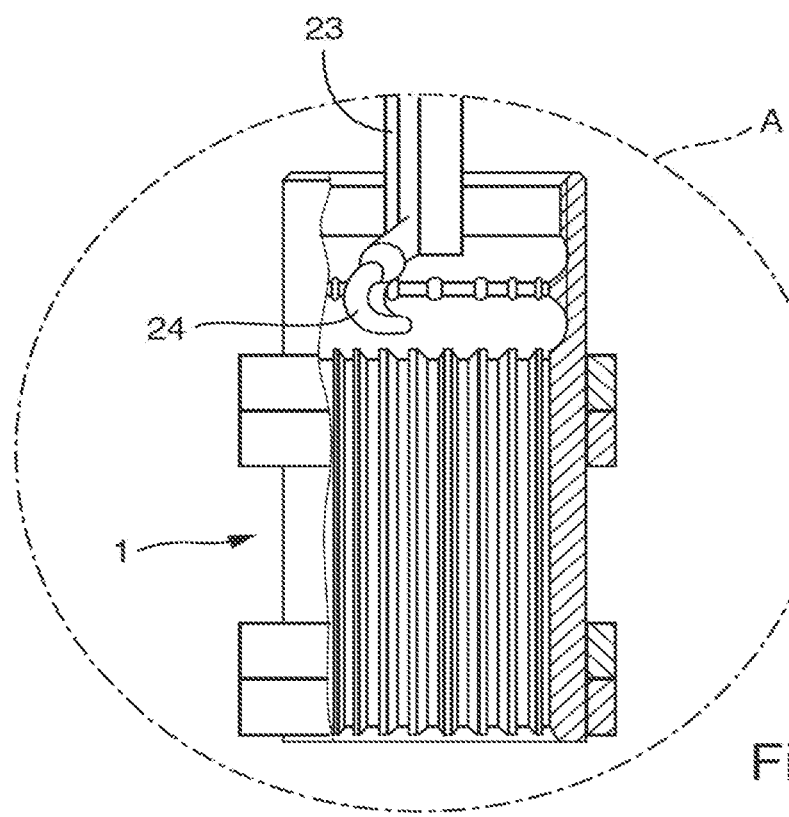
FIG. 4 is an enlarged view of the detail A in FIG. 3.

For the purpose of hardening the latching means transfer region 8, use is advantageously made of an induction device 20, as is shown for example in FIGS. 3 and 4. The induction device 20 comprises an inductor plate 21, an access line 22, a heating conductor 23, which can advantageously also serve as a cooling medium conductor, and an inductor 24. The inductor 24 is advantageously dimensioned and geometrically designed such that merely a defined region of the latching elevation 7, in particular the predefined latching means transfer region 8 of the latching elevation 7 of the latching section 5 of the slide element 1, is heated to a defined, in particular predetermined, temperature, and advantageously subsequently cooled by means of a flowable cooling medium, to produce a defined hardness in the latching means transfer region 8. For this purpose, a cooling medium, in particular a flowable cooling medium such as for example cooling water, is advantageously is passed on via the structure of the heating conductor 23 into the inductor 24 and, from there, applied to the previously heated location or heated section, in particular the latching means transfer region 8 of the latching elevation 7.

The cooling medium is not conducted via the heating conductor (inductor) to the location to be hardened. Advantageously, the cooling medium (Aquatensid) is conducted via an external component to said location.

Figure 5:
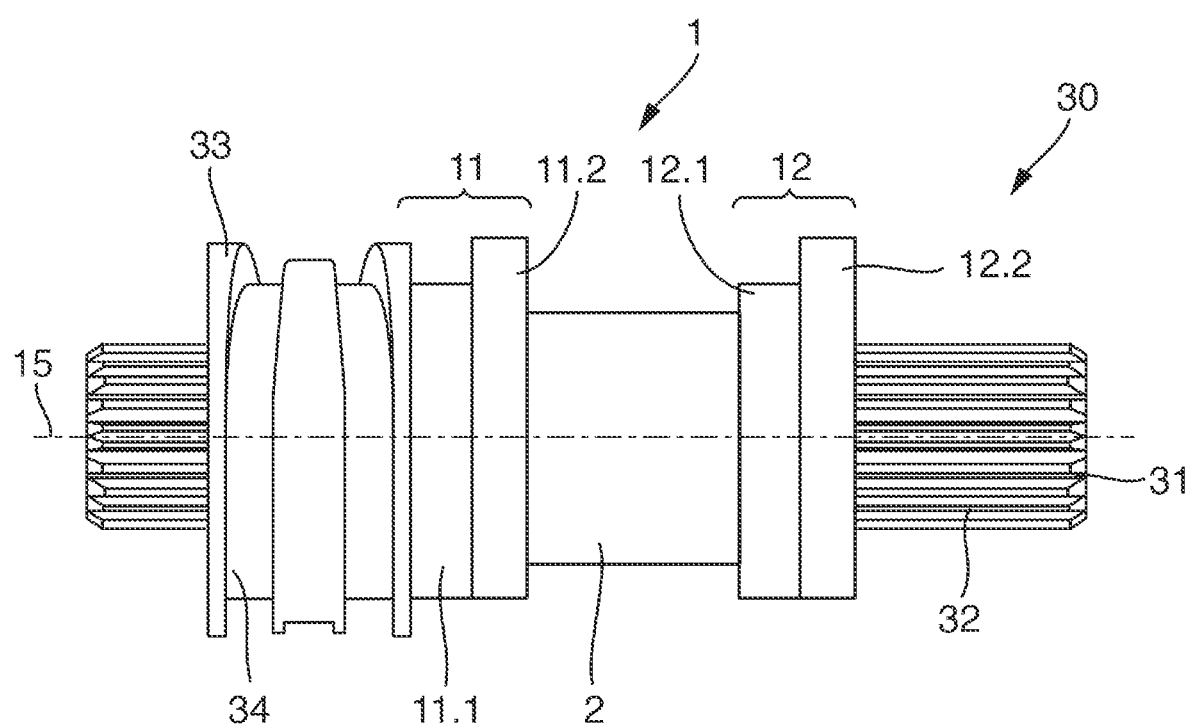
FIG. 5 is a side view of an example camshaft.

FIG. 5 shows an embodiment of a camshaft 30 according to the invention, which comprises a shaft 31 and at least one slide element 1 according to the preceding type, in particular according to FIGS. 1 and 2, which at least one slide element is movable on the shaft 31 in a manner rotationally conjoint with respect to the shaft 31 and in an axial direction along the shaft 31. The shaft 31 is advantageously formed as a toothed shaft and comprises a toothing 31, in particular an outer toothing, which is formed as a longitudinal toothing. The camshaft 30 furthermore comprises a latching means (not shown here), which comprises an inelastic latching means head and an elastic latching means neck. The latching means neck is connected to the shaft 31 such that the latching means neck is arranged in a recess extending radially into the shaft 31, while the latching means head interacts with the latching section of the slide element 1. The embodiment shown in FIG. 5 furthermore comprises an adjusting slotted guide 33 which is operatively connected to the slide element 1. This means that the adjusting slotted guide 33 is, for example, formed integrally on the slide element 1 or connected in a force-fitting or form-fitting manner to the slide element 1. The adjusting slotted guide is advantageously arranged on one face end of the slide element 1. The adjusting slotted guide 33 advantageously serves for the displacement of the slide element 1 along the longitudinal axis 15, that is to say in an axial direction. For this purpose, for example, an actuator pin (not shown here) is introduced into the guide groove 34 of the adjusting slotted guide 33, which is connected rotationally conjointly to the shaft 31 and is consequently rotated along therewith. During rotation of the shaft 31 about the longitudinal axis 15 thereof, the guide groove 34, of S-shaped or double S-shaped form, slides along the actuator pin and is consequently—owing to the guide path of the guide groove 34—displaced along the longitudinal axis 15. During displacement of the adjusting slotted guide 33 along the longitudinal axis 15, the slide element 1 is also displaced along the longitudinal axis 15.

LIST OF REFERENCE SIGNS

1 Slide element
2 Slide sleeve
3 Longitudinal toothing
4 Inner wall
5 Latching section
6 Latching means receiving part
6.1 (First) latching groove
6.2 (Second) latching groove
7 Latching elevation
8 Latching means transfer region
9 Tooth
10 Toothed ring
11 (First) cam segment
11.1 (First) cam
11.2 (Second) cam
12 (Second) cam segment
12.1 (First) cam
12.2 (Second) cam
13 Cam and circle
14 Cam elevation
15 Longitudinal axis
20 Induction device
21 Inductor plate
22 Access lines
23 Heating conductor with cooling medium conductor
24 Inductor
30 Camshaft
31 Shaft
32 Toothing
33 Adjusting slotted guide
34 Guide path
A Detail

What is claimed is:

1. A slide element for displacement of a cam segment in an axial direction along a shaft of a camshaft, the slide element comprising a slide sleeve having a longitudinal toothing formed at least sectionally along an inner wall of the slide sleeve, the slide sleeve having a latching section that is formed on the inner wall and is configured to interact with a latching means, wherein the latching section comprises a latching means receiving part that includes latching grooves formed adjacently in an axial direction and a latching elevation formed between the latching grooves and directed inward, wherein the latching elevation is partially hardened, exclusively in a latching means transfer region, wherein the latching means transfer region of the latching elevation comprises teeth that are formed adjacently to one another in a circumferential direction.

2. The slide element of claim 1 wherein the latching elevation is partially hardened by way of induction heating.

3. The slide element of claim 2 wherein the latching elevation is heated at least in the latching means transfer region by way of an inductor, wherein a width of the inductor corresponds to a length of the latching means transfer region formed in a circumferential direction and to be hardened.

4. The slide element of claim 1 wherein at least one of the teeth is formed in an extension to the longitudinal toothing.

5. The slide element of claim 1 comprising a cam segment that includes axially adjacently arranged cams with mutually different cam profiles including a cam base circle and including a cam elevation.

6. The slide element of claim 5 wherein the latching elevation is partially hardened in the latching means transfer region that is opposite the cam elevation of the cam segment.

7. The slide element of claim 1 wherein the latching means transfer region is cooled by way of a flowable cooling medium that is conductible via an inductor to the latching means transfer region.

8. A slide element for displacement of a cam segment in an axial direction along a shaft of a camshaft, the slide element comprising a slide sleeve having a longitudinal toothing formed at least sectionally along an inner wall of the slide sleeve, the slide sleeve having a latching section that is formed on the inner wall and is configured to interact with a latching means, wherein the latching section comprises a latching means receiving part that includes latching grooves formed adjacently in an axial direction and a latching elevation formed between the latching grooves and directed inward, wherein the latching elevation is partially hardened, exclusively in a latching means transfer region, wherein the latching elevation comprises a toothed ring of ring-like form that includes teeth formed adjacently in a circumferential direction.

9. The slide element of claim 8 wherein at least one of the teeth is formed in an extension to the longitudinal toothing.

\* \* \* \* \*